No. 735,629. PATENTED AUG. 4, 1903.
C. F. WEBER.
APPARATUS FOR INCLOSING MEATS FOR BOILING.
APPLICATION FILED SEPT. 25, 1901.
NO MODEL.
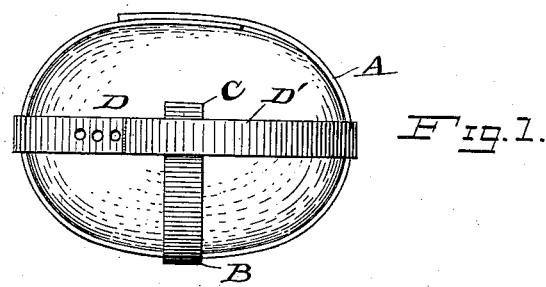
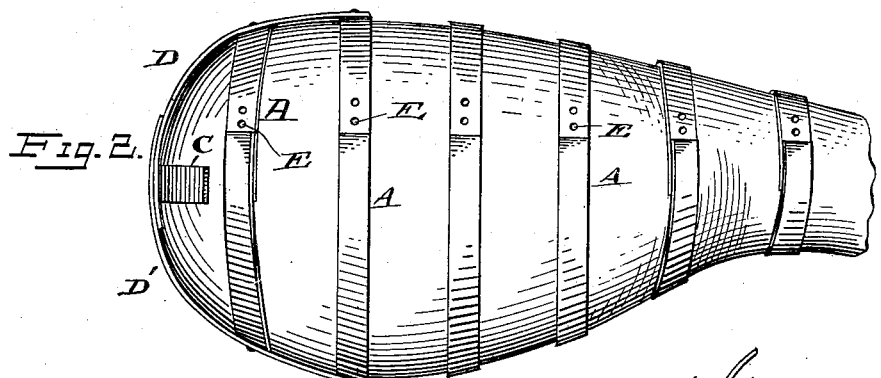
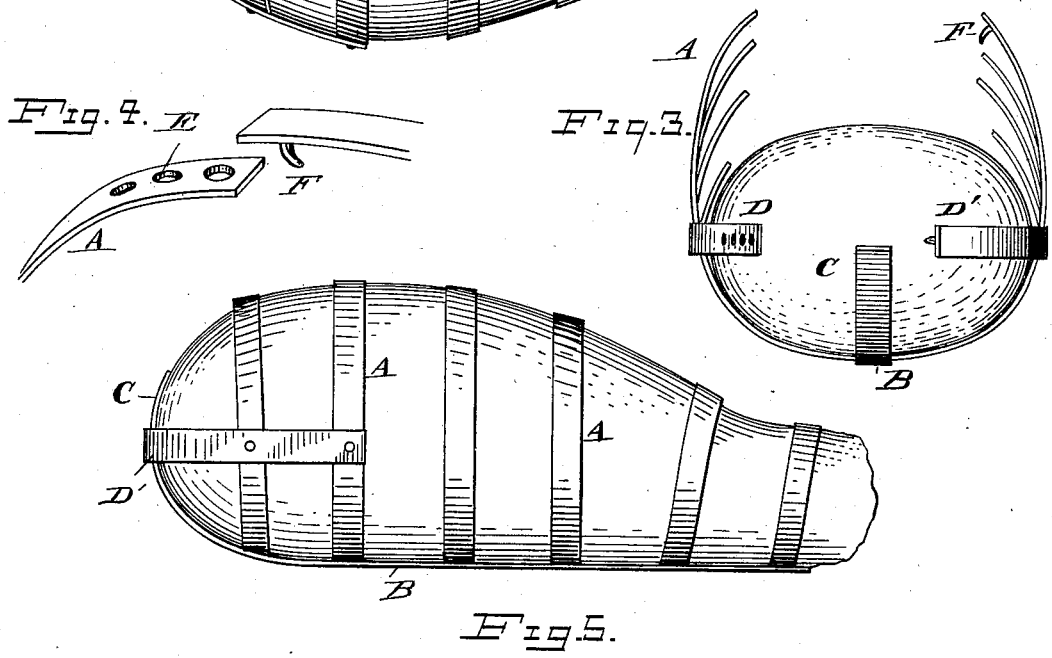
WITNESSES
INVENTOR
Charles F. Weber.
By L. M. Thurlow,
Att'y.

No. 735,629. Patented August 4, 1903.

UNITED STATES PATENT OFFICE.

CHARLES F. WEBER, OF PEORIA, ILLINOIS.

APPARATUS FOR INCLOSING MEATS FOR BOILING.

SPECIFICATION forming part of Letters Patent No. 735,629, dated August 4, 1903.

Application filed September 25, 1901. Serial No. 76,506. (No model.)

*To all whom it may concern:*

Be it known that I, CHARLES F. WEBER, a citizen of the United States, residing at Peoria, in the county of Peoria and State of Illinois, have invented certain new and useful Improvements in Apparatus for Inclosing Meats for Boiling; and I do hereby declare that the following is a full, clear, and exact description of the invention, which will enable others skilled in the art to which it appertains to make and use the same.

This invention relates to an apparatus for inclosing meats for boiling.

The object of my invention is to firmly compress hams from which the bones have been removed and bind them in a quick and thorough manner ready for cooking.

A further object is to provide a quick method and by which a large number of hams may be treated in the shortest possible time.

It is well known that the methods usually adopted for binding hams for the above purpose are crude and unsatisfactory, because they consume a great deal of time, and for the further reason that the meat is damaged to a considerable degree.

One of the methods is to bind cord around and around the ham; but this cannot be done so as to make a perfect job, since the meat cannot be held together in a neat manner after the bone has been removed. The cords cut into the meat and form deep cuts therein, and for this reason, if for no other, the method is undesirable. Another method is to sew the hams in bags; but this method consumes even more time than the other, to say nothing of the expense for the materials used. The cord process is expensive, but the latter is more so. There are other methods and devices for inclosing meats, but they are not desirable, because too much time is necessary in preparing them for use.

My improved device is simple, quick, and cheap as compared with the above, as will be readily seen from the following specification, with the aid of the accompanying drawings, in which—

Figure 1 is an end view of a ham, showing an inclosing basket therefor. Fig. 2 is a plan view of the ham and form or basket. Fig. 3 is an end view which corresponds with Fig. 1, except that the basket is shown in an open position. Fig. 4 is a perspective view of the two ends of a metal strip or band forming part of the basket, showing a hook in the extremity of one of the portions and a series of holes in the other. Fig. 5 is a side view of the ham and its basket.

In the figures I illustrate an inclosing basket for a ham, which consists of a series of spring-metal bands A, formed in the shape of a U. These are all secured to a back strip B, which forms a support for the entire number. One end of said strip B is bent up to form the curved extension C, which incloses the large end of the ham, as shown in Fig. 5. At this end also are two overlapping strips D D', which are secured to the bands A and pass around outside of the portion C. The extremities of A and D D' are provided with a locking arrangement which consists of a series of holes E in one extremity of each of the bands and a hook F on the other extremity. Normally all of the strips are in an open position, as indicated in Fig. 3, so that the ham may be placed within the cage thus formed ready to be compressed and held. The basket may be closed and locked by forcing the complementary ends of each strip together by hand and placing the said hook F within a convenient hole, where it will remain without further help, other than the natural outward tendency due to the pressure of the compressed meat within. The ends of the strips A of the basket are bent slightly inward, so that as they approach each other the end having the holes E will be lowest and will pass over the ham and the end having the hook will pass over the end having the holes, so that when the hook reaches the holes it passes over them. When the pressure is deemed sufficient and the ham is released, the tendency of the bands or strips is to separate; but the downward inclination of the end carrying the hook will force such hook into the nearest hole, where it must stay until released by pressure.

It will be noted that the strips A are of varying length, occasioned by the varying circumferences of the ham at different places, and it will be also noted that said strips are set on the back strip B in such a manner as to conform readily to the curves of the meat.

As above stated, the ordinary methods of handling hams is expensive, because much valuable time is consumed in binding with cord or sewing the hams in bags, and, as before intimated, the item of expense in furnishing the materials necessary for this is considerable and must be taken into account, and it is to be remembered also that this work is all done by hand.

The advantage of a basket of metal that can be readily opened and closed upon the meat will be appreciated. The lengths of the parts A, D, and D' are such that the largest hams may be incased as well as the smallest, since it is only necessary to provide a sufficient number of the holes in these to receive the hooks at any position the bands may reach. As before stated, the baskets may be used by hand, but a machine, such as is shown, is much to be preferred, since less time is necessary in the operation and a tighter binding of the ham is the result.

Other kinds and forms of meat can be treated in this way if desired, as it is not necessarily confined to the treatment of hams alone. I desire to make it clearly understood that I do not wish to confine myself to the exact construction shown and described, since other forms can be used as readily and with the same results.

The basket must be of an open form, so that the cooking of the ham by the boiling process will not be retarded or interfered with in any way, as will be understood.

I am aware that inclosing means for meats exist which comprise a series of fabric or leather held substantially parallel with each other and secured to a fabric which entirely envelops the meat. In my device the bands, being of metal, are always found in position ready to be locked in place and when unfastened again take up the same position as before, locking by reason of their flexing power. Time is consumed in spreading the bands of the device referred to when a piece of meat is to be bound, and each strap must be placed in position to be taken hold of. In mine the "basket" is thrown upon the table in the position shown in Fig. 3 and the meat thrown into it and the bands bent down and interlocked.

Having thus described my invention, I claim—

1. In a device for inclosing meats for cooking, a series of flexible metal bands adapted for closing around the meat and when released to open away therefrom by reason of their flexibleness, a single rigid support for the bands, one end of such support being turned up to extend around the end of the meat, such end being flexible, flexible metal bands secured to the first-mentioned ones and extending around the end of the meat and around the upturned flexible ends of the rigid support and arranged at right angles to the said first bands, all of the bands being of various lengths as set forth and means for interlocking their ends around the meat as set forth.

2. In a device for inclosing meats for boiling, the several flexible metal bands A of U shape when in their positions of rest or when not flexed, the same adapted for inclosing the meat, the hooks F at one end of such band, the other ends of the bands having holes therein to receive the hooks for interlocking purposes, the rigid support B upon which the bands are mounted and secured at their middle, the same having the upturned end C, and the bands D D' secured to certain of the bands A at right angles thereto, said bands D D' also having hooks and holes in their ends as set forth and described.

3. In a device for inclosing meats for cooking, a series of flexible metal bands adapted to be closed around the meat and when released to open away therefrom by reason of their flexibleness, a single rigid support for the bands, one end of such support being turned up to extend around the end of the meat, such end being flexible, flexible metal bands secured to the first-mentioned ones and extending around the end of the meat and arranged at right angles to the said first-named bands, said end bands adapted to inclose the upturned end of the support for the purposes explained all of said bands being of varying lengths as set forth, and means on the ends thereof for interlocking them when closed around the meat.

4. In a device for inclosing meats for boiling, the several flexible metal bands A of U shape for inclosing the meat, the hooks F at one end of each band, the other ends of the bands having holes therein to receive the hooks, the rigid support B upon which the bands are mounted and secured at their middle portions, the same having the upturned end C, and the bands D D' secured to certain of the bands A at right angles thereto, said bands also having hooks and holes in their ends as set forth.

In testimony whereof I affix my signature in presence of two witnesses.

CHARLES F. WEBER.

Witnesses:
J. H. BLUSCH,
A. KEITHLEY.